Aug. 29, 1944.　　　　L. L. LOVELL　　　　2,357,121
PROCESS FOR DESULPHURIZING A HYDROCARBON DISTILLATE
Filed March 1, 1943
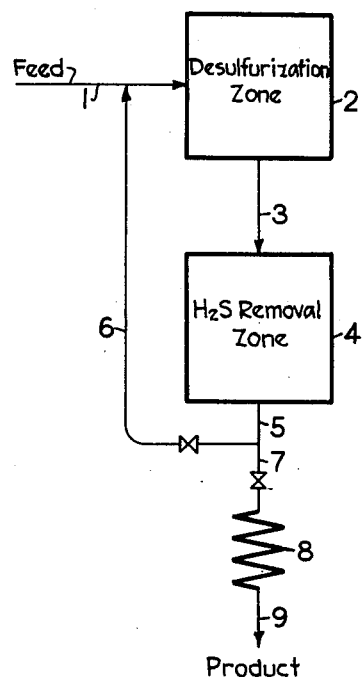
Inventor: Lawrence L. Lovell
By his Attorney:

Patented Aug. 29, 1944

2,357,121

UNITED STATES PATENT OFFICE 2,357,121

PROCESS FOR DESULPHURIZING A HYDROCARBON DISTILLATE

Lawrence L. Lovell, Wood River, Ill., assignor to Shell Development Company, San Francisco, Calif., a corporation of Delaware Application March 1, 1943, Serial No. 477,661

12 Claims. (Cl. 196—28)

This invention relates to a process for desulphurizing hydrocarbon oils. More particularly, it deals with the treatment of hydrocarbon oils in the vapor phase, which oils contain organic sulphur impurities, with certain catalysts to produce hydrogen sulphide from said impurities, and then removing said hydrogen sulphide to produce a hydrocarbon oil of reduced sulphur content.

It is already known that mercaptans contained in hydrocarbon oils can in part be broken down to hydrogen sulphide and hydrocarbons by contacting the oils with catalysts at elevated temperatures, i. e., above about 180° C.; but in the processes previously developed the reduction in organic sulphur content was incomplete. This incompleteness in the breaking down of the organic sulphur compounds (mercaptans, etc.) is due to the fact that the reaction involved is an equilibrium reaction which may be represented by the following equation:

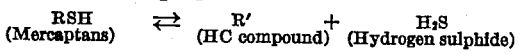

$$\underset{\text{(Mercaptans)}}{\text{RSH}} \rightleftarrows \underset{\text{(HC compound)}}{\text{R'}} + \underset{\text{(Hydrogen sulphide)}}{\text{H}_2\text{S}}$$

which proceeds toward the right at elevated temperatures and tends to reverse if the temperature is lowered such as during condensation of the oils after contact with the catalyst. In order to cause this reaction to progress to completion towards the right, thereby reducing substantially all the organic sulphur compounds present in the oil to form hydrogen sulphide, it is necessary to repeatedly remove the hydrogen sulphide as soon as and as continuously as possible after it is formed. This is the theory upon which the process of this invention is based.

Accordingly, it is a purpose of this invention to provide an improved, simple, economical and continuous hydrocarbon oil desulphurization process which with the aid of simple equipment permits the production of a hydrocarbon oil having a very low organic sulphur content—lower than heretofore possible with the same type of catalyst and equipment. Purposes incidental to the improved process of this invention are to produce hydrocarbon oils of improved color, stability, and inhibitor susceptibility; reduced carbon residue and corrosivity; and in the case of a gasoline, improved octane number and lead susceptibility.

Generally, the process of this invention comprises contacting hydrocarbon oil vapors containing organic sulphur compounds, e. g., mercaptans, etc., with a catalyst and under conditions to produce hydrogen sulphide from said organic sulphur compounds, removing said hydrogen sulphide thus formed from said hydrocarbon vapors, continuously recycling a major portion of the resulting hydrocarbon vapor freed of hydrogen sulphide for further contact with said catalyst, and withdrawing the remaining minor portion of said resulting hydrocarbon vapors freed of hydrogen sulphide as the final product. The ratio of incoming oil to be treated to the recycled oil for contact with said catalyst should be greater than 1, and preferably at least 2, as will be explained later.

The accompanying drawing represents a general flow diagram of the process of this invention. This process comprises essentially four major steps. Referring to the drawing, the first step (A) comprises introducing the hydrocarbon oil feed containing organic sulphur compounds through line 1 into desulphurization zone 2, wherein it is vaporized and contacted with a catalyst to produce hydrogen sulphide and a treated hydrocarbon oil vapor. The next step (B) comprises passing the resulting mixture of hydrogen sulphide and treated hydrocarbon oil vapors through line 3 into hydrogen sulphide removal zone 4, wherein the hydrogen sulphide is removed from said mixture. The third step (C) comprises withdrawing the resulting treated hydrocarbon oil vapors free from hydrogen sulphide from zone 4 through line 5 and unequally dividing them so that the larger portion thereof is recycled back to join the feed in line 1 entering desulphurization zone 2 through valved line 6. The fourth step (D) comprises withdrawing the remaining smaller portion of treated hydrocarbon oil vapors free from hydrogen sulphide through valved line 7 and passing them through condenser 8, from which is withdrawn the final product through line 9 consisting of hydrocarbon oil substantially free of organic sulphur compounds and hydrogen sulphide.

The type of hydrocarbon oils which may be treated by the process of this invention includes hydrocarbon oils which contain organic sulphur compounds as impurities and can be substantially entirely vaporized without causing incipient cracking of the oil. Some examples of such hydrocarbon oils are petroleum oils including naphthas, gasolines, kerosenes, distillate fuels, gas oils, neutral oils suitable for transformer oils, distilled lubricating oils, etc. The oil may have been previously subjected to other treatments such as distillation, solvent extraction, acid treatment, caustic treatment, and/or water washing.

In view of the fact that the degree of desulphurization varies with the type of sulphur compound present in the oil, the type of catalyst, and the treating temperature, and in view of the fact that, in general, low-boiling sulphur compounds are less readily removed by the process than are high-boiling compounds, it may be desirable to fractionally distill the treating oil into several fractions and treat each fraction separately at different pressures and/or temperatures (for example, the lightest fraction being treated at the highest pressure). Or the heavier and more viscous oils may be diluted with an inert distillation aid such as propane or butane to lower their vaporization temperature.

The catalysts which may be employed in the first and desulphurization step (A) of this process are the commonly used decolorizing adsorbents employed in the petroleum industry. Some such adsorbents are: activated charcoals; synthetic gels such as silica gel, alumina gel, etc.; natural and acid activated clays such as fuller's earths including Attapulgas, Florida, Olmstead, etc.; various bleaching and decolorizing clays from Southern California, Oklahoma, Arizona, Utah, England, Germany, Russia, etc.; crude ores such as bauxite, chromite, vanadite, molybdenite and molybdite, descloizite, wolframite, magnesite, minette, various iron ores, etc.; or mixtures of one or more of the above mentioned adsorbents. These catalysts may contain oxides, sulphides or salts of one or more of the following metals: iron, cobalt, nickel, copper, zinc, cadmium, lead, vanadium, chromium, molybdenum, tungsten, manganese, etc.

These catalysts may be regenerable or not, depending upon their nature, the process conditions, and how they are used. It is preferable to choose a regenerable catalyst so that the process may be made as economical and continuous as possible. These catalysts may be employed in the form of a stationary bed, or in fluid form either as a dust or as a slurry suspended in a suitable carrier liquid.

In this first step (A) the hydrocarbon oil containing the sulphur compound is contacted with the catalyst at a temperature above that of vaporization of substantially all of the hydrocarbon oil but below that of incipient cracking of said oil. The oil may be vaporized prior to this contact, or it may be contacted in the liquid state under pressure and then flash vaporized. The temperature of this contact usually ranges, for most petroleum hydrocarbon oils, between about 200 and 500° C. and preferably the pressure is atmospheric, although other pressures may be employed depending upon the properties of the oil treated.

The oil vapors now containing varying amounts of hydrogen sulphide are passed to the second step (B) where they are treated to remove the hydrogen sulphide. Means which may be used to accomplish this include contacting the hot vapors with caustic alkali, or with small amounts of oxygen and a catalyst to oxidize the hydrogen sulphide to sulphur, or by removing the hydrogen sulphide with adsorbents, or any oxide of a metal having high affinity for sulphur, such as an alkali earth metal oxide, e. g., MgO, CaO, BaO; or a heavy metal oxide such as copper, zinc, cadmium, lead, manganese, iron, cobalt, nickel, etc. oxide; or a mixture of two or more of the above or with another oxide such as aluminum oxide, etc.

Upon contact with hydrogen sulphide, oxides are converted to the corresponding sulphide. For example, $CuO_2 + 2H_2S \rightarrow CuS + 2H_2O$. Some metal sulphides such as the copper or iron sulphides may be regenerated by heating them with hot air or superheated steam or both.

Since the relative amount of sulphur compound in the treating oil is very small, the amount of water vapor produced in the above reaction is usually materially less than 1% of the total vapor passing from the absorber. Accordingly, for all practical purposes this amount may be disregarded.

In the third step (C) the vapors free of hydrogen sulphide are split, a portion being withdrawn and the remainder being recirculated through both the desulphurization and the removal zone 2 and 4 of steps (A) and (B). In order to realize a material benefit, it is necessary to recirculate at least half the vapors because the equilibrium amount of organic sulphur compounds left in the vapors after the contact is a function of the original concentration of these compounds, and the greater the recycle ratio the lower is the concentration and the more complete is the desulphurization of the oil vapors. This recycle ratio, however, has an upper economic limit because of pumping, heating and heat maintenance costs. Thus economical recycle ratios vary between about 1:1 and about 10:1, and preferably between about 2:1 and 5:1.

Withdrawn oil vapors in the fourth step (D) are usually condensed and collected in an accumulator where water, if any, from the reaction, as indicated above, may be separated.

The apparatus employed in the process of this invention may be of any convenient or conventional construction or design provided it withstands the conditions of the process. For continuous operation it is desirable that two or more catalytic contact chambers and two or more hydrogen sulphide absorbers be provided in each step so that one may be used while the other is being regenerated.

I claim as my invention:

1. A process for desulphurizing a hydrocarbon distillate containing organic sulphur compounds comprising contacting said distillate at a temperature below that of incipient cracking with a catalyst which converts said organic sulphur compounds to hydrogen sulphide whereby a treated distillate vapor is produced containing hydrogen sulphide, removing said hydrogen sulphide from said vapor, dividing the resulting vapor free from hydrogen sulphide into two unequal portions, recirculating the larger of said portions to recontact said catalyst along with more of said distillate, and withdrawing the smaller of said portions.

2. A process for desulphurizing a normally liquid hydrocarbon distillate containing organic sulphur compounds comprising contacting said distillate in the vapor form at a temperature below that of incipient cracking with a catalyst which converts said organic sulphur compounds to hydrogen sulphide, whereby the treated distillate vapor is produced containing hydrogen sulphide, passing the resulting vapors over a metallic oxide to remove said hydrogen sulphide therefrom, dividing the resulting vapors free from hydrogen sulphide into two unequal portions, recycling the larger of said portions to recontact with said catalyst along with more of said distillate, withdrawing the remaining smaller of said portions, and condensing it as a desulphurized product.

3. The process of claim 2 wherein the recycle ratio of hydrogen sulphide-free vapor to said distillate is between 1:1 and 10:1.

4. The process of claim 2 wherein the recycle ratio of hydrogen sulphide-free vapor to said distillate is between 2:1 and 5:1.

5. The process of claim 2 wherein the catalyst is a petroleum decolorizing adsorbent.

6. The process of claim 2 wherein the catalyst is an activated clay.

7. The process of claim 2 wherein the hydrocarbon distillate is a fuel oil.

8. The process of claim 2 wherein the distillate is a kerosene.

9. The process of claim 2 wherein the distillate is a gasoline.

10. The process of claim 2 wherein the metallic oxide is copper oxide.

11. A continuous process for desulphurizing a normally liquid hydrocarbon distillate containing organic sulphur compounds comprising contacting said distillate in the vapor form at a temperature below that of incipient cracking with a petroleum decolorizing adsorbent whereby a treated distillate vapor is produced containing hydrogen sulphide, passing said resulting vapors over copper oxide to remove said hydrogen sulphide, dividing the resulting vapors free from hydrogen sulphide into two unequal portions, recycling the larger of said portions to recontact said adsorbent along with more of said distillate, withdrawing the remaining smaller of said portions and condensing it as a desulphurized product.

12. A process for desulphurizing a hydrocarbon distillate containing organic sulphur compounds comprising contacting said distillate with a liquid slurry of an acid activated clay, heating the resulting mixture to a temperature above that required for vaporization of said distillate and below that of incipient cracking whereby a treated distillate vapor is produced containing hydrogen sulphide, fractionally distilling said distillate and hydrogen sulphide from said slurry and passing the resulting vapors over a metallic oxide to remove said hydrogen sulphide therefrom, dividing the resulting vapors freed of hydrogen sulphide into two unequal portions, recycling the larger of said portions to recontact said slurry along with more of said distillate, and withdrawing the remaining smaller of said portions.

LAWRENCE L. LOVELL.